(12) United States Patent
Bosses

(10) Patent No.: US 8,075,649 B2
(45) Date of Patent: Dec. 13, 2011

(54) VACUUM BAG AND VACUUM BAG ATTACHMENT ASSEMBLY

(75) Inventor: Mark D. Bosses, Boca Raton, FL (US)

(73) Assignee: Zenith Technologies, LLC, Boca Raton, FL (US)

(*) Notice: Subject to any disclaimer, the term of this patent is extended or adjusted under 35 U.S.C. 154(b) by 0 days.

(21) Appl. No.: 12/628,840

(22) Filed: Dec. 1, 2009

(65) Prior Publication Data

US 2011/0126377 A1    Jun. 2, 2011

(51) Int. Cl.
*A47L 9/14*         (2006.01)
(52) U.S. Cl. ....... 55/347; 15/352; 15/DIG. 8; 55/DIG. 2
(58) Field of Classification Search ............... 55/DIG. 2; 15/347, 352, DIG. 8; *A47L 9/14*
See application file for complete search history.

(56) References Cited

U.S. PATENT DOCUMENTS

| | | | | |
|---|---|---|---|---|
| 1,997,720 A * | 4/1935 | Emmons | ......... | 55/370 |
| 2,090,453 A * | 8/1937 | Leathers | ......... | 15/330 |
| 4,364,757 A | 12/1982 | Leonatti | | |
| 4,791,699 A * | 12/1988 | Sovis et al. | ......... | 15/344 |
| 6,007,594 A * | 12/1999 | Kaczor | ......... | 55/367 |
| 6,049,941 A | 4/2000 | Vollenweider, II | | |
| 6,813,808 B2 * | 11/2004 | Nguyen et al. | ......... | 15/352 |
| 6,988,293 B2 | 1/2006 | Ritter | | |
| 2001/0005983 A1 | 7/2001 | Berfield et al. | | |
| 2008/0086991 A1 | 4/2008 | Hale | | |
| 2009/0256100 A1 | 10/2009 | Lee | | |

* cited by examiner

Primary Examiner — David Redding
(74) Attorney, Agent, or Firm — Roylance, Abrams, Berdo & Goodman, L.L.P.

(57) ABSTRACT

A vacuum bag includes a container portion having at least one opening. A threaded fitting is disposed in communication with the at least one opening, and the threaded fitting is configured for attachment to a vacuum nozzle of a vacuum cleaner.

24 Claims, 5 Drawing Sheets

VACUUM BAG AND VACUUM BAG ATTACHMENT ASSEMBLY

FIELD OF THE INVENTION

The present invention relates to vacuum cleaner bags, and in particular to vacuum bags having connectors for attachment to a vacuum cleaner nozzle.

BACKGROUND OF THE INVENTION

It is well known to provide vacuum cleaners with disposable dust or filter bags. Such bags are usually formed of a porous paper and define a chamber in which dust and dirt are collected. After use, the bags are removed and discarded.

Because such bags are only used once and are discarded when full of dirt and dust, they must be economical to produce and market. However, the bags must be sufficiently durable to permit them to be installed and removed without damage. They must also provide a connecting and sealing structure for connecting the bag to the dirt-laden air discharge of the cleaner which is easily installed and which provides a reliable seal so that all of the dirt-laden air enters the filter bag.

It is known to provide such disposable dust bags with an inlet including a substantially rigid collar, formed of cardboard or plastic, and an elastomeric diaphragm which engages and provides a seal with a vacuum nozzle of the cleaner. However, the elastomeric diaphragm does not provide a rigid connection, and therefore an air tight seal may not always be formed between the connector and the vacuum bag. This can lead to leakage of dust and dirt from between the vacuum bag and the vacuum nozzle. Dust and dirt that leaks from the connection of the vacuum bag to the vacuum nozzle can then enter the vacuum motor, causing excess wear and tear and other damage or re-circulation of the dirt back into the ambient air.

Accordingly, there is a need for a vacuum bag that allows for a rigid and air-tight connection with a vacuum nozzle of a vacuum cleaner.

SUMMARY OF THE INVENTION

A vacuum bag according to an exemplary embodiment of the present invention comprises: a container portion comprising at least one opening; and a threaded fitting disposed in communication with the at least one opening, the threaded fitting configured for attachment to a vacuum nozzle of a vacuum cleaner.

In at least one embodiment, the container portion is made of a substantially flexible material.

In at least one embodiment, the container portion is made of at least one of paper, non-woven material or woven material.

In at least one embodiment, the threaded fitting is made of a substantially rigid material.

In at least one embodiment, the threaded fitting is made of at least one of plastic, metal, cardboard or fiberboard.

A vacuum cleaner according to an exemplary embodiment of the present invention comprises a vacuum bag and a vacuum nozzle. The vacuum bag comprises a container portion comprising at least one opening, and a threaded fitting disposed in communication with the at least one opening. The vacuum nozzle comprises a threaded component that engages with the threaded fitting.

In at least one embodiment, the threaded component is a rotating threaded lock ring.

In at least one embodiment, the vacuum nozzle comprises a reduced diameter portion, and rotation of the threaded lock ring pulls the reduced diameter portion through the at least one opening.

In at least one embodiment, the container portion is made of a substantially flexible material.

In at least one embodiment, the container portion is made of at least one of paper, woven material and non-woven material.

In at least one embodiment, the threaded fitting is made of a substantially rigid material.

In at least one embodiment, the threaded fitting is made of at least one of plastic, metal, cardboard and fiberboard.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Various exemplary embodiments of the present invention are directed to a vacuum bag including a threaded fitting intended for attachment to a vacuum cleaner nozzle. In a vacuum cleaner assembly including the vacuum bag, the vacuum cleaner nozzle may include a threaded rotating lock ring that mates with the threaded fitting of the vacuum bag. The threaded connection provides an air-tight and secure seal between the vacuum cleaner nozzle and the vacuum bag.

Figure 1:
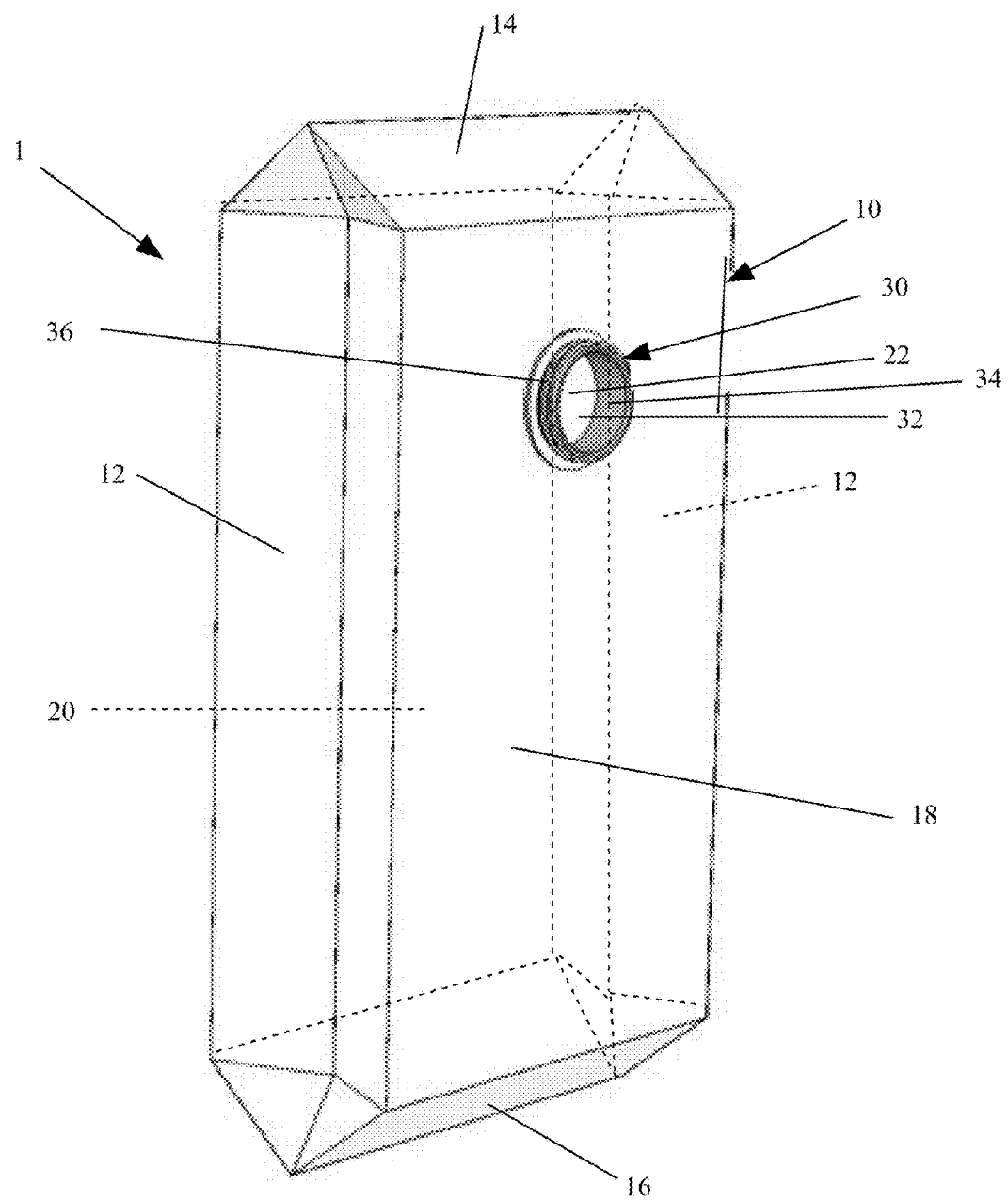
FIG. 1 is a perspective view of a vacuum bag according to an exemplary embodiment of the present invention.

FIG. 1 is a perspective view of a vacuum bag, generally designated by reference number 1, according to an exemplary embodiment of the present invention. The vacuum bag 1 includes a container portion 10 having side walls 12, top walls 14, bottom walls 16, front wall 18 and back wall 20. Although the container portion 10 is shown with a generally rectangular shape in FIG. 1, it should be appreciated that the container portion 10 may have any suitable shape. The container portion 10 may be made of a flexible and porous material, such as, for example, paper, non-woven material, woven material or a combination thereof. An opening 22 is formed in the front wall 18 of the container portion 10 for intake of debris sucked in through a vacuum nozzle (not shown in FIG. 1).

A threaded fitting 30 may be attached to the front wall 18 of the container portion 10 by, for example, adhesive. In this regard, the threaded fitting 30 may include a flange portion 35 (see FIG. 3) that is directly connected to the container portion 10. The threaded fitting 30 is generally cylindrical in shape and includes a fitting opening 32 that is communication with the opening 22 in the container portion 10. The threaded fitting 30 further includes an inner surface 34 and a threaded outer surface 36, and is preferably made of a substantially rigid material, such as, for example, plastic, metal, cardboard, fiberboard or a combination thereof. As discussed in further detail below, the threaded fitting 30 mates with a correspondingly threaded portion of a vacuum cleaner nozzle to form an air-tight seal.

Figure 2:
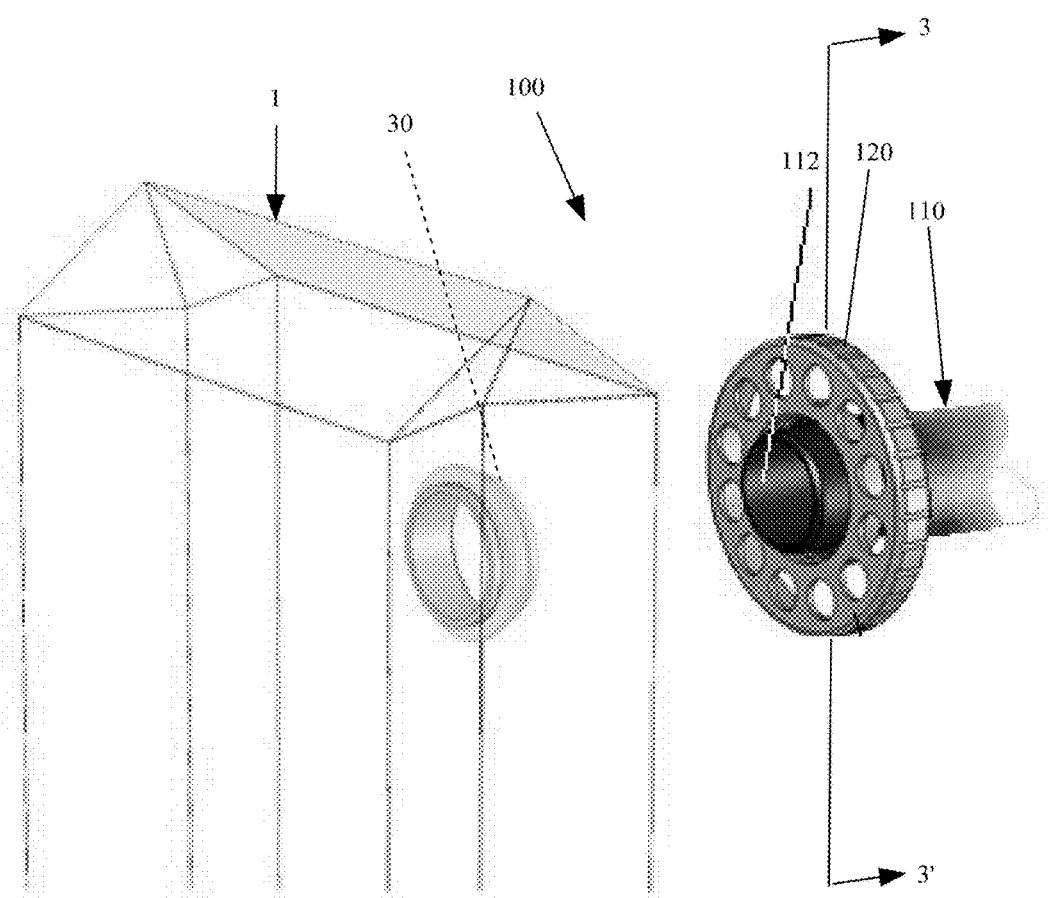
FIG. 2 is a perspective view of a vacuum bag attachment assembly of a vacuum cleaner according to an exemplary embodiment of the present invention.
Figure 3:
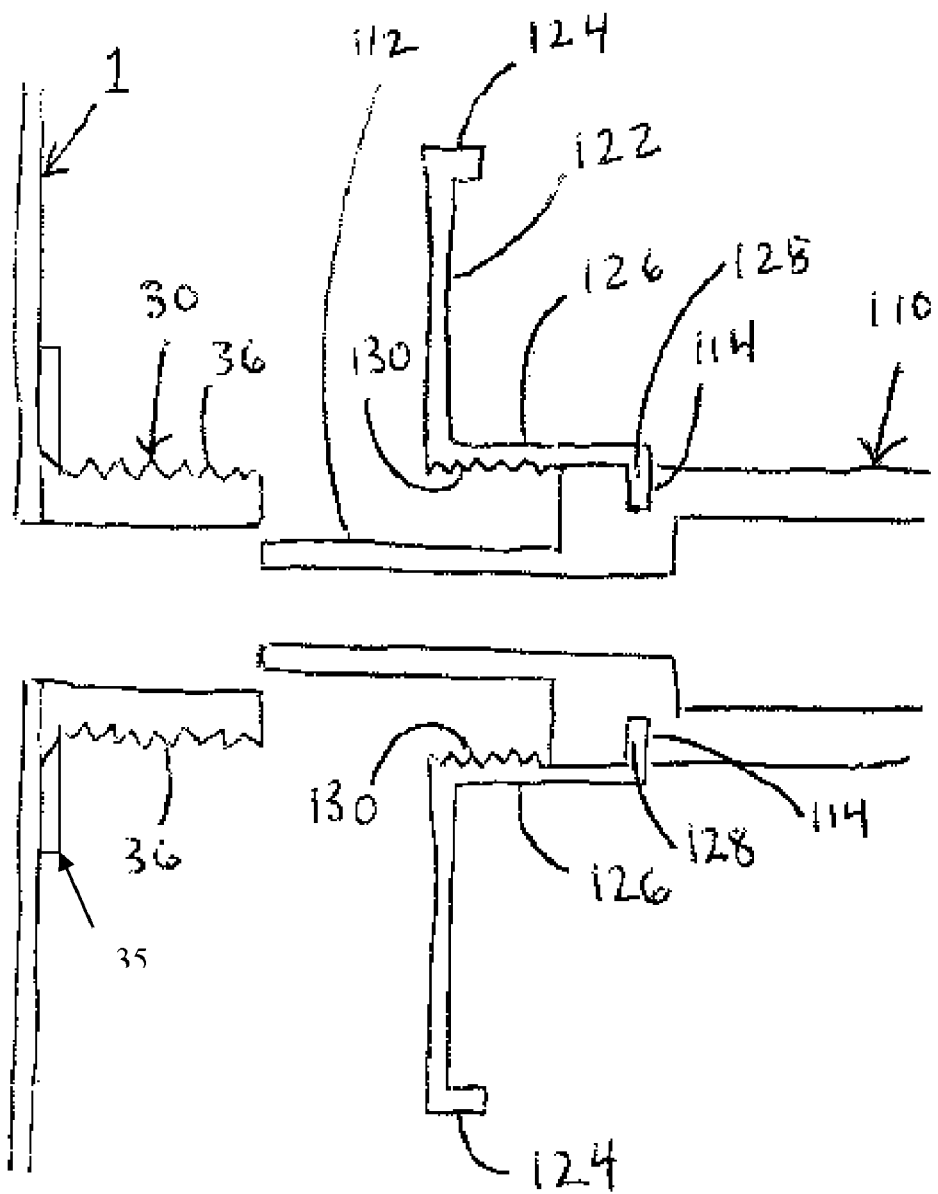
FIG. 3 is a cross sectional view taken along line 3-3' of FIG. 2.

FIG. 2 is a perspective view of a vacuum bag attachment assembly, generally designated by reference number 100, of a vacuum cleaner according to an exemplary embodiment of the present invention. The vacuum bag attachment assembly 100 includes the vacuum bag 1 and a vacuum cleaner nozzle 110. The vacuum cleaner nozzle 110 includes at one end a rotating threaded lock ring 120 that mates with the threaded outer surface 36 of the threaded fitting 30. In this regard, as shown in FIG. 3, which a cross sectional view of the vacuum bag attachment assembly 100 taken along the line 3-3' in FIG. 2, the vacuum cleaner nozzle 110 includes at one end a reduced diameter portion 112. A notch 114 is formed in the vacuum cleaner nozzle 110 adjacent to the reduced diameter portion 112. The lock ring 120 includes a disc-shaped web 122, an outer flange 124 and an inner flange 126. The inner flange 126 includes a projection 128 that is in frictional engagement with the notch 114 in the vacuum cleaner nozzle 110, which allows the lock ring 120 to freely rotate around the vacuum cleaner nozzle 110. The inner flange 126 includes a threaded inner surface 130. The inner diameter of the inner flange 126 is larger than the diameter of the reduced diameter portion 112 of the vacuum cleaner nozzle 110, such that the threaded inner surface 130 of the inner flange 126 extends over and is spaced from the reduced diameter portion 112.

Figure 4:
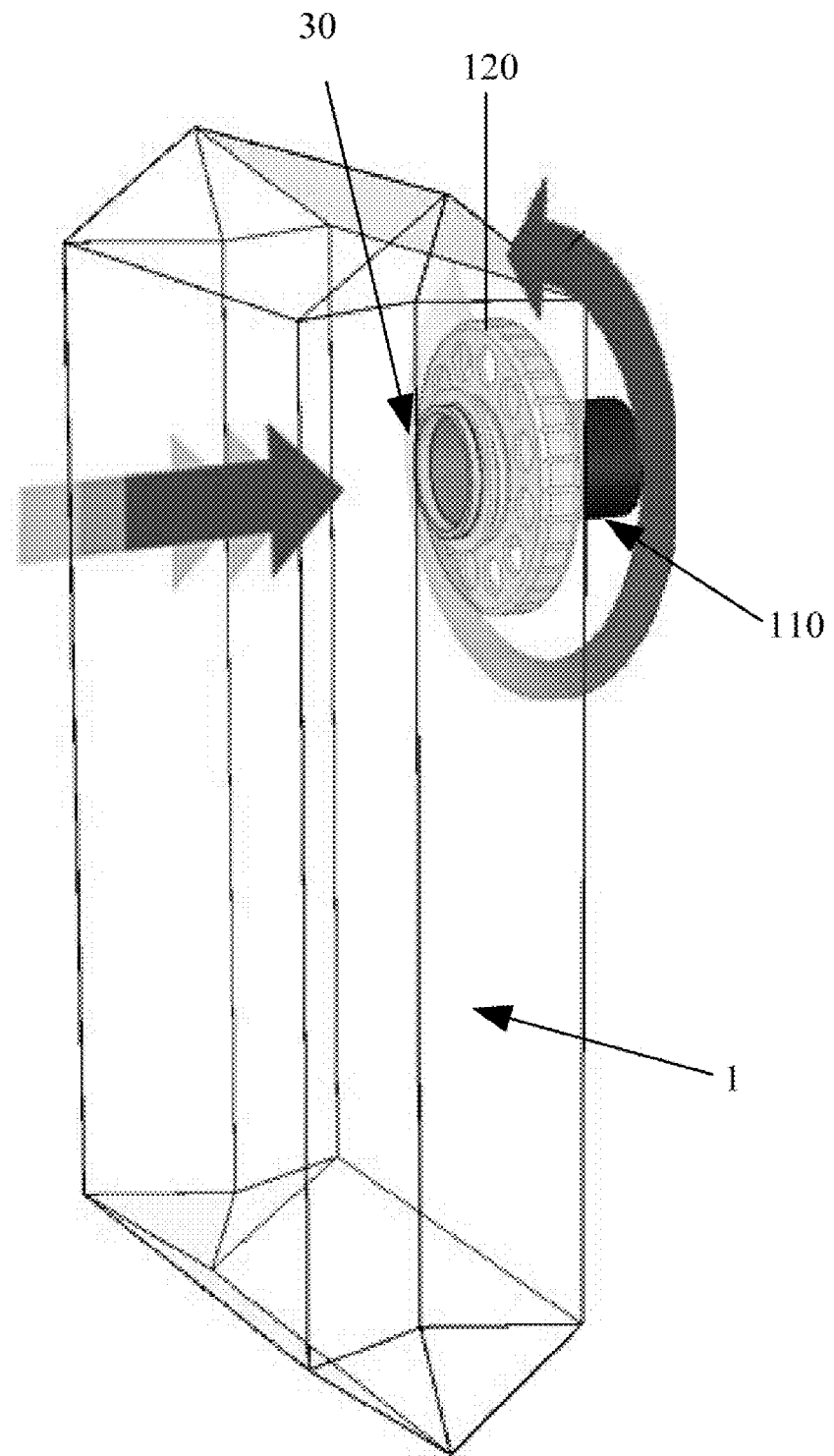
FIG. 4 is a perspective view of a vacuum bag attachment assembly of a vacuum cleaner according to an exemplary embodiment of the present invention.
Figure 5:
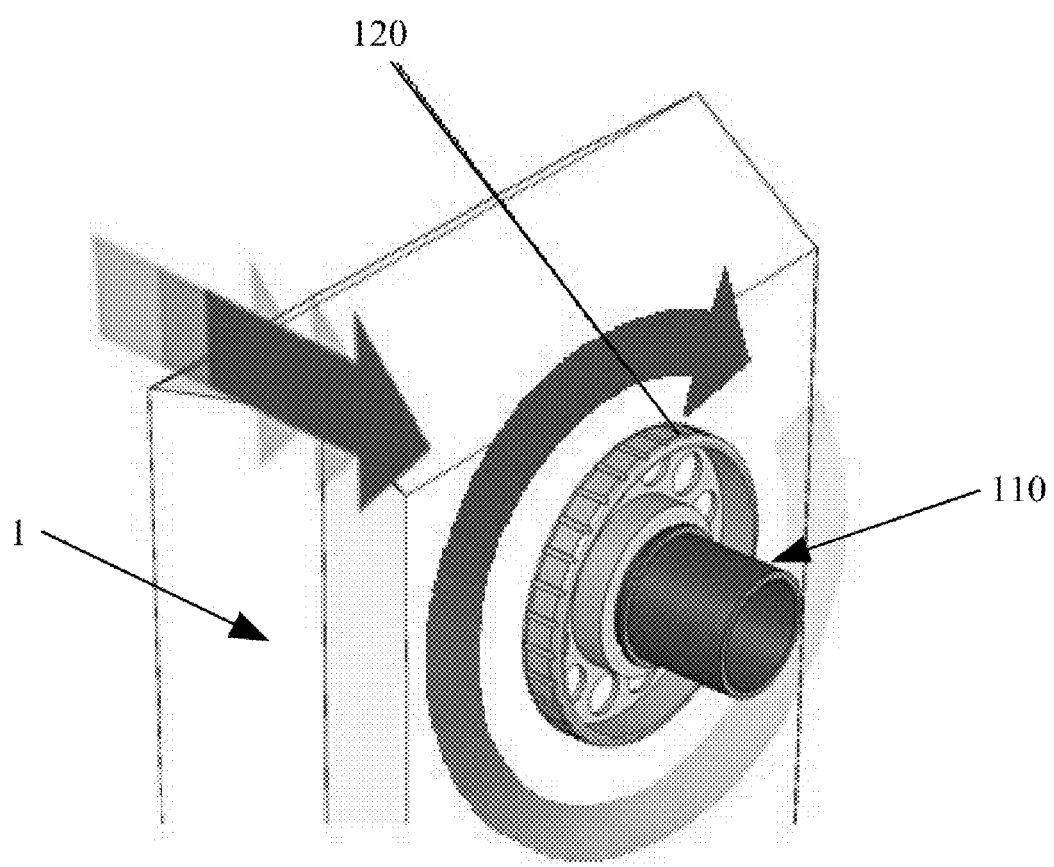
FIG. 5 is a perspective view of a vacuum bag attachment assembly of a vacuum cleaner according to an exemplary embodiment of the present invention.

As shown in FIGS. 4 and 5, in order to assemble the vacuum cleaner assembly 100, the reduced diameter portion 112 of the vacuum cleaner nozzle 110 is first aligned with and inserted into fitting opening 32. As the vacuum cleaner nozzle 110 is inserted through the fitting opening 32, the threaded outer surface 36 contacts the threaded inner surface 130 of the lock ring 120. The lock ring 120 may then be rotated so that the threaded outer surface 36 may fully engage the threaded inner surface 130 of the lock ring 120. As the lock ring 120 is rotated, the vacuum bag 1 is pulled towards the vacuum cleaner nozzle 110, so that the reduced diameter portion 112 is fully inserted through the fitting opening 32 and the opening 22 in the vacuum bag 1.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A vacuum bag, comprising:
   a porous container portion for intake of debris comprising at least one opening, the container portion having a front wall and an opposite rear wall; and
   a threaded fitting disposed in communication with the at least one opening, the threaded fitting being configured for attachment to a vacuum nozzle of a vacuum cleaner and being substantially centered on a horizontal axis of the front wall.
2. The vacuum bag of claim 1, wherein the container portion is made of a substantially flexible material.
3. The vacuum bag of claim 2, wherein the container portion is made of at least one of paper, non-woven material and woven material.
4. The vacuum bag of claim 1, wherein the threaded fitting is made of a substantially rigid material.
5. The vacuum bag of claim 1, wherein the threaded fitting is made of at least one of plastic, metal, cardboard and fiberboard.
6. A vacuum cleaner, comprising:
   a vacuum bag comprising:
      a porous container portion comprising at least one opening, the container portion having a front wall and an opposite rear wall; and
      a threaded fitting disposed in communication with the at least one opening and substantially centered on a horizontal axis of the front wall; and
   a vacuum nozzle comprising a threaded component that engages with the threaded fitting.
7. The vacuum cleaner of claim 6, wherein the threaded component is a rotating threaded lock ring.
8. The vacuum cleaner of claim 7, wherein the vacuum nozzle comprises a reduced diameter portion, and rotation of the threaded lock ring pulls the reduced diameter portion through the at least one opening.
9. The vacuum cleaner of claim 6, wherein the container portion is made of a substantially flexible material.
10. The vacuum cleaner of claim 9, wherein the container portion is made of at least one of paper, woven material and non-woven material.
11. The vacuum cleaner of claim 6, wherein the threaded fitting is made of a substantially rigid material.
12. The vacuum cleaner of claim 11, wherein the threaded fitting is made of at least one of plastic, metal, cardboard and fiberboard.
13. A vacuum bag, comprising:
   a porous container portion having only one opening through which debris passes; and
   a threaded fitting connected to a wall of the container portion in communication with the opening and configured to attach to a vacuum nozzle of a vacuum cleaner, the wall of the container portion having a width substantially equivalent to that of an opposing wall and the threaded fitting being substantially centered on a horizontal axis of the wall.
14. The vacuum bag of claim 13, wherein the wall is substantially rectangular.
15. The vacuum bag of claim 13, wherein the threaded fitting is spaced inwardly from each edge of the wall.
16. The vacuum bag of claim 13, wherein the threaded fitting is centered on a horizontal axis of the wall and spaced inwardly from each edge of the wall.
17. The vacuum bag of claim 13, wherein the threaded fitting is rigidly connected to the wall to substantially prevent rotation of the threaded fitting.
18. A vacuum bag, comprising:
   a porous container portion having only one opening through which debris passes; and
   a threaded fitting connected to a wall of the container portion in communication with the opening and configured to attach to a vacuum nozzle of a vacuum cleaner, the wall of the container portion having a width substantially equivalent to that of an opposing wall and the threaded fitting being spaced inwardly from each edge of the wall.

19. The vacuum bag of claim 18, wherein the wall is substantially rectangular.

20. The vacuum bag of claim 18, wherein the threaded fitting is rigidly connected to the wall to substantially prevent rotation of the threaded fitting.

21. A vacuum bag, comprising:
a porous container portion having only one opening through which debris passes; and
a threaded fitting connected to a wall of the container portion in communication with the opening and configured to attach to a vacuum nozzle of a vacuum cleaner, the threaded fitting being substantially centered on a horizontal axis of the wall.

22. The vacuum bag of claim 21, wherein the wall is substantially rectangular.

23. The vacuum bag of claim 21, wherein the threaded fitting is rigidly connected to the wall to substantially prevent rotation of the threaded fitting.

24. The vacuum bag of claim 21, wherein the threaded fitting is spaced inwardly from each edge of the wall.

* * * * *